United States Patent [19]
Schmitzer et al.

[11] 4,150,075
[45] Apr. 17, 1979

[54] PROCESS FOR THE CONTINUOUS PRODUCTION OF FOAM PLASTIC BLOCKS HAVING A RECTANGULAR CROSS-SECTION

[75] Inventors: Willi Schmitzer, Birlinghoven; Reiner Raffel, St. Augustin; Ferdinand Althausen, Neunkirchen Seelscheid; Ferdinand Proksa, Bergisch Neukirchen, all of Fed. Rep. of Germany

[73] Assignee: Maschinenfabrik Hennecke GmbH, Leverkusen, Fed. Rep. of Germany

[21] Appl. No.: 849,840

[22] Filed: Nov. 9, 1977

Related U.S. Application Data

[60] Continuation of Ser. No. 614,298, Sep. 17, 1975, abandoned, which is a division of Ser. No. 248,912, May 1, 1972, Pat. No. 3,942,925.

[30] Foreign Application Priority Data

May 11, 1971 [DE] Fed. Rep. of Germany ....... 2123216
Dec. 31, 1971 [DE] Fed. Rep. of Germany ....... 2165903
Dec. 31, 1971 [DE] Fed. Rep. of Germany ....... 2165902

[51] Int. Cl.$^2$ .............................................. B29D 27/04
[52] U.S. Cl. ................................... 264/46.3; 264/39; 264/45.8; 264/46.2; 264/51; 264/331; 264/DIG. 84
[58] Field of Search ....................... 264/51, 46.2, 46.3, 264/DIG. 84, 331, 39, 45.8; 156/79

[56] References Cited

U.S. PATENT DOCUMENTS

| | | | |
|---|---|---|---|
| 3,240,846 | 3/1966 | Voelker | 264/46.2 |
| 3,354,503 | 11/1967 | Joseph et al. | 264/46.2 X |
| 3,702,274 | 11/1972 | Wooler | 156/79 |
| 3,984,195 | 10/1976 | Del Carpio | 264/46.3 X |
| 4,056,595 | 11/1977 | Bokelmann | 264/51 X |

*Primary Examiner*—Philip Anderson
*Attorney, Agent, or Firm*—Gene Harsh; Joseph C. Gil

[57] ABSTRACT

Continuous foam blocks with rectangular cross-section are produced on a side-limited conveyor band by feeding a foamable mixture to a cover foil travelling with said conveyor band and covering the free surface of the mixture with a bearing layer not earlier than immediately after the supply of the mixture and not later than before the zone in which a skin would be formed on the free surface of the block.

17 Claims, No Drawings

PROCESS FOR THE CONTINUOUS PRODUCTION OF FOAM PLASTIC BLOCKS HAVING A RECTANGULAR CROSS-SECTION

This is a continuation now abandoned, of application Ser. No. 614,298 filed Sept. 17, 1975, which itself is a division of application Ser. No. 248,912 filed May 1, 1972, now U.S. Pat. 3,942,925.

Process for producing continuous rectangular cross-section foam plastics blocks by free-foaming.

The present invention relates to a process for producing continuous foam plastics blocks of rectangular cross-section by free-foaming in which a foamable liquid mixture is supplied to a travelling support having lateral boundaries, the mixture foaming on the support.

Such foam plastics blocks, which are for example commonly produced from polyurethane based materials, are cut into webs or block sections after they have been manufactured and are converted into for example upholstery material and insulating material.

The continuous blocks are produced on a conveyor belt, which is covered with a foil, and which has lateral boundaries. A liquid, foamable mixture is delivered on to the surface foil of the conveyor belt, and the mixture then foams up in the box formed by the conveyor belt and lateral boundaries. The box is open in the upward direction. It is because of this feature that the process is referred to as free-foaming since the foam is able to foam up freely inside the box.

It is a disadvantage of the free-foaming process that the surface of the block does not have a rectangular cross-section, but curves downwardly from the centre to the lateral edges. This results in a wastage of 8 to 10% of the foam plastics material. Consequently, many different methods have been tried for obtaining a foam plastics block of rectangular cross-section.

All previous proposals were based on the fact that as the plastics material foams it is subject to such a high degree of friction on the lateral boundaries as it rises that the mixture collapses and the formation of the foam is retarded. To avoid this attempts were made to draw the surface foils of the lateral boundaries in an upward direction or to stretch them at the same speed as that at which the foamable mixture foamed up. Success has been obtained by this procedure, but the cost is extremely high. In addition to the speed of foaming, it is also necessary when pulling up or stretching the surface foils of the lateral boundaries to take into account the transporting speed in the conveying direction. For this purpose, expensive gripper devices and guiding elements were necessary, in order to expand the lateral surfacing foils in the conveyor direction in accordance with the existing height of the block.

It is consequently an object of the present invention to provide a process with which blocks of rectangular cross-section can be produced with inexpensive equipment using the free-foaming process.

The present invention is based on the fact that it is not only the friction of the foam on the side walls that causes the curvature of the surface of the foam plastics block, but also the surface tensions in the skin which is being formed.

According to the present invention there is provided a process for the production of continuous foam plastics blocks of rectangular cross-section by free-foaming, in which a liquid, foamable mixture is supplied to a laterally bounded, travelling support on which the mixture foams up, wherein not earlier than immediately after the supply of the mixture and not later than before the zone in which a skin would be formed on the free surface of the block, this surface is covered by a bearing layer which floats on the mixture or the forming foam plastic. By this simple measure the deformations of a skin is avoided and a foam plastics block of substantially rectangular cross-section is produced.

It is already known in the foam plastics art to use bearing members. However, this is done with the so-called double conveyor belts, on which plates are produced. These plates are often covered on both sides with a covering foil, which consists of sheet metal, roofing felt or the like, so that a sandwich element is formed. In foaming, the foam plastic being formed in the gap between the upper belt and lower belt experiences a pressure, for which reason this process is also called the pressure-foaming process. In this case, in constrast to the free-foaming process as previously described, a good adhesion with the surface layers is desired. Corresponding to the pressure exerted by the double conveyor belt on the foam plastic as it is forming, there is obtained a multiple compression of the foam material as compared with the free-foaming process. This procedure is entirely different from the present invention.

It is advantageous to use a gas-permeable bearing member, so that the gas being generated in the foaming reaction can escape through it.

Due to the fact that the foamable, liquid mixture cannot be delivered with a broad-slit nozzle extending over the entire working range, but rather that a reciprocating mixing head or several stationary mixing heads must be used, there is often a variation in thickness in the application of the mixture, as seen over the working width. In a preferred embodiment of the process according to the invention, the bearing member is accordingly flattened out to the same level transversely of the conveying direction.

Several methods are possible for covering the unbounded surface of the foam plastic block: a foil may be laid thereon or a liquid film may be sprayed on or a tough, gel-like coating may be applied.

It has been found that the flattening or levelling device can very easily become soiled by the foaming mixture, and in fact when a gas-pervious bearing member is used. Ideally one would use a bearing member which is gas-permeable but is impermeable for the mixture. However, it has hitherto been shown in practice that, when a sufficiently liquid-impermeable web is used, the gas permeability is too low and gas bubbles are formed between the bearer member and foam plastic surface during the foaming reaction, which bubbles cause wastage of material. By "liquid-impermeable" it is to be understood that the degree of impermeability is sufficient to prevent the foamable mixture penetrating through the web. On the other hand, if a web having sufficient gas permeability is chosen, then also foaming mixture pentrates therethrough.

These disadvantages are avoided in accordance with one embodiment of the invention by placing a liquid-impermeable web on the bearer member before the levelling operation.

The bearer member in such a case may consist for example or a porous paper web or foil, or the paper web or foil may have a perforation which permits passage of the gas. The liquid-impermeable web, on the contrary, can be gas-impermeable. The gas being generated during the foaming reaction then discharges mainly towards the sides between the bearer member and liquid-tight web. The mixture penetrating through the bearer member remains between the latter and web, so that the levelling device is not soiled.

In one particular embodiment for carrying out the process according to the invention, the liquid-impermeable web or sheet is removed at the place where the foaming reaction ends. In this way, a better dissipation of gas is produced for the subsequent reaction.

When producing foam plastics blocks from a mixture giving off a relatively small amount of gas during the reaction, it is advantageous to lay on the mixture a combination of a gas-permeable bearer member with a liquid-impermeable web. This simplifies the construction in that only one bearing device and one removal device are necessary.

Alternatively, however, even when the gas-permeable bearer and liquid-impermeable web are laid on separately, the bearer and web can be removed simultaneously.

An apparatus utilized according to the invention for carrying out the process comprises an endless revolving conveyor belt with lateral boundaries and a delivery device for the mixture at the entry end of the belt, the entry end being provided with stations from which covering foils are unwound, a laying-on device being provided above the upper run of the conveyor belt for a bearer member which floats on the mixture or foam plastic. The bearer member can now be applied to the mixture by means of this laying on device.

One particular embodiment of the apparatus utilized for carrying out the invention additionally comprises a levelling device for the said bearer member. The purpose of the levelling device is to hold the bearer transversely of the conveying direction at the same level, without exerting any substantial pressure on the foam plastic which is being formed.

The levelling device advantageously extends over the full foaming range. In this way, any lifting of the bearer and penetration of air is prevented.

The laying-on device utilized according to the invention can be made in various ways.

In a first embodiment, it consists of an unreeling station for a surface or covering foil which serves as the bearer member. The surface foil may consist, for example, of a paper web or a synthetic plastics foil. In a second embodiment the laying-on device consists of spraying nozzles. By means of the spraying nozzles, a liquid or a viscous mass can be sprayed on to the surface of the mixture. The levelling device is advantageously fixed on the frame of the conveyor belt, at least at its end closest to the delivery device. In its simplest form it may consist of a roller or doctor, with which the liquid mixture is levelled. The bearing member is supplied before this roller or doctor. In the case where a surface foil is used as bearer member, this foil runs beneath the levelling device. In the case where a liquid or a viscous layer is used, the roller or doctor provides for the uniform distribution of the liquid or layer over the surface of the foamable mixture.

In one particular embodiment of the levelling device utilized, the latter extends over the full length of the foaming region. In contrast to the levelling action produced by a roller or a doctor, which is along one line transversely of the operating direction, this produced a surface-like levelling.

In the conveying direction after the laying-on device, there is preferably arranged a second such device for a liquid-tight web, this web being guided beneath the levelling device. In this way, the application of the liquid-tight web is substantially facilitated and any soiling of the levelling device is avoided.

An alternative method for solving this problem is to associate a cleaning arrangement with the levelling device. If for example there is an irregular soiling over the width of the levelling device, the heavily soiled areas can give rise to undesirable longitudinal channels on the surface of the foam plastic.

If the arrangement is equipped with a levelling device fixed only at the forward end, the cleaning arrangement is preferably constructed as an arrangement for spraying on solvents.

The solvent, e.g. ethyl acetate or dimethyl formamide, is applied directly to the levelling device or to that side of the bearer member which is facing the levelling device, in order to dissolve any mixture which passes and foams through the bearer. The dissolved mixture is then carried away with the bearer, which is later removed.

In one particular embodiment, the levelling device for levelling the surface over the foaming region consists of a slatted grating in addition to a roller or doctor. Such a slatted grating is naturally only capable of being used when a surface foil travelling with the foam is employed as the bearer member.

In an alternative embodiment, the levelling device consists of a web of synthetic plastics material, rubber, wire gauze or the like.

In another embodiment, the levelling device utilized consists of a revolving belt, of which the lower run hangs down loosely. This has the advantage that the levelling device revolves at the speed of travel of the foam plastic and the bearer and does not experience any friction.

In this case, the cleaning arrangement advantageously consists of a stripper. For example, it may have the form of a doctor or a rotating brush. However, a solvent-spraying device can also be used alone in this case or in combination with the stripper.

The levelling device is advantageously adjustable in width. When using a slatted grating, this advantageously consists of at least two parts which are displaceable laterally one into the other, so that the total width is adjustable. For adjusting the working width of the levelling device, it is also very satisfactory to use lattice gratings, which are constructed in the manner of a lazy tongs device.

The levelling device is advantageously fixed on a holding means which is adjustable in height. This has the advantage that the levelling device can be adjusted to the expected level of the foam plastic, so that when it is arranged in the region of the mixture, it can serve at the same time as a calibrating device.

In another, particularly advantageous embodiment of the apparatus utilized according to the invention the levelling device is adjustable in the working direction. This has the result that when foam plastic mixtures reacting at different speeds are used, such as those mixtures which are necessary for producing different qualities of foam plastic, the position of the levelling device can be adapted to the foaming region.

Several embodiments of the apparatus according to the invention are shown in purely diagrammatic form in the drawings, and are described more fully below. In the drawings:

FIG. 1 shows an apparatus in side elevation with a slatted grating as a levelling device, FIG. 2 is a front view of the slatted grating FIG. 3 shows the slatted grating in plan view, FIG. 4 shows a section A-B in FIG. 3

FIG. 5 shows an apparatus with an endless revolving levelling device,

Figure 6:
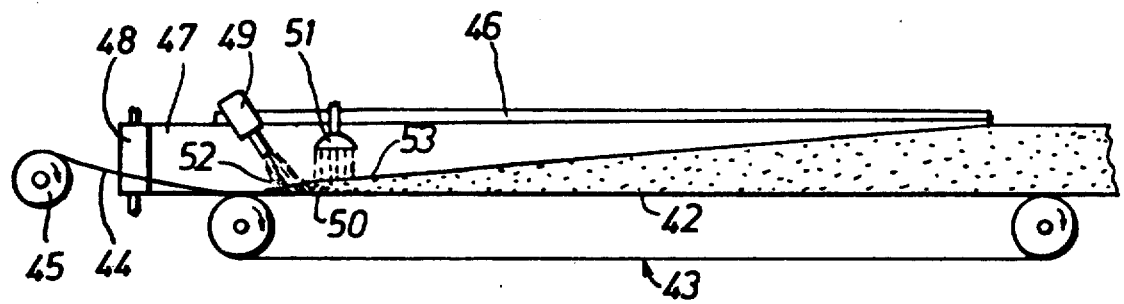
FIG. 6 shows an apparatus with spraying nozzles.

FIG. 1 shows a cover foil 3 which is laid on an upper run 1 of a conveyor belt 2, the foil unwinding from a supply station 4. Lateral boundaries 5 are likewise covered by surface foils 6, which unwind from supply stations 7, only one of which is shown. A supply device 8 delivers a foamable mixture on the surface foil 3 at the rear end portion of the upper run 1, and is distributed thereon as a thin layer. As it travels in the conveying direction, the mixture 9 then foams up in a foaming region 10 to form a foam plastics block 11. In the foaming region 10, a layer 12 is applied onto the mixture forward and adjacent the supply device 8 for bearing and floating on and traveling with the mixture during the foaming thereof. The layer 12 is applied so as to bear on the layer of mixture 9 and the foam plastic block 11 being formed therefrom. The layer 12 consists of a cover foil which unwinds from a supply station 13. From the unwinding station 13, it is also possible for a combination of a gas-permeable bearing layer and a liquid-impermeable web to be laid on. The bearing layer 12 is guided beneath a levelling device 14, which comprises a roller 15 and a slatted grating 16. The roller 15 is mounted to be adjustable in height in a supporting frame 17, which in turn is guided in a slide 18 which is displaceable in the conveying direction and on whih is mounted the supply station 13.

The construction of the slatted grating 16 can be seen from FIGS. 2 to 4. The slatted grating 16 consists of two parts 19 and 20, belts 21 and 22, respectively, being provided at the lateral boundaries 5. Slats 23 and 24 are fixed on the belts. The slats interengage by means of a groove 25 and tongue 26 (FIG. 4), so that the parts 19 and 20 of the slatted grating 16 are displaceable relatively to make it possible to adjust the working width. The tolerances between the grove 25 and tongue 26 are kept relatively large, so that the slatted grating 16 is able to adapt itself in the longitudinal direction to the rising profile of the synthetic plastics block which is forming.

FIG. 5 shows a surface foil 30 which is laid on an upper run 28 of a conveyor belt 29, the foil running off a supply station 31. Lateral boundaries 32 are separated by cover foils 33 from the forming foam plastic. These cover foils 33 unwind from supply stations 34. A foamable mixture is applied in a thin layer 36 to the cover foil 30 from a supply arrangement 35. A cover film 37 from a supply station 38 is arranged on the lever 36 and serves as a bearing layer, the station 38 serving as the laying-on device. A levelling device is formed by an endless belt 39, which runs over rollers 40 and or which a lower run 41 depends loosely from the rollers 40 on the forming foam plastic and rests thereon.

In the embodiment shows in FIG. 6, a cover foil 44 is laid on an upper run 42 of a conveyor belt 43, the foil unwinding from a supply station 45. The lateral boundaries 46 are covered with cover foils 47, which are unwound from supply stations 48. A supply arrangement 49 applies a foamable mixture to the cover foil 44 as a thin layer 50. The laying-on device here consists of a spraying nozzle 51, which covers the surface of the mixture 52 with a thin film 53.

Figure 7:
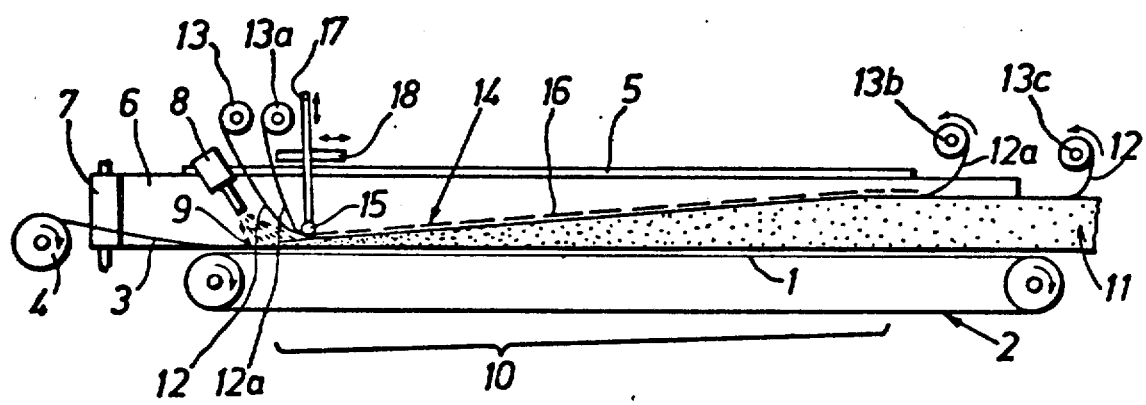
FIG. 7 shows an apparatus similar to FIG. 1, but with an additional unreeling station.

FIG. 7 uses the same reference numerals as in FIG. 1 (where applicable). The cover foil 3 is applied to the upper run 1 of the conveyor belt 2 the foil being unwound from a supply station 4. The lateral boundaries 5 are covered with the cover foils 6, which unwind from the supply stations 7. The supply arrangement 8 applies foamable mixture to the cover foil 3, and the mixture is distributed thereon as a thin layer 9. In the conveying direction, the mixture 9 then foams up in the foaming region 10 into the foam plastic block 11. In the foaming region 10, a gas-permeable bearing member 12 is laid on the mixture 9 and the foam plastic block 11 which is forming. The bearing layer 12 consists of a cover foil unwinding from a supply station 13. From a supply station 13a, a liquid-impermeable web or sheet 12a is unwound and is laid on the bearing layer 12. The bearing layer 12 and the web 12a are guided beneath a levelling device 14 which consists of a roller 15 and a slatted grating 16. The roller 15 is mounted for vertical adjustment in the supporting frame 17, which in its turn is guided in a carriage 18 displaceable in the conveying direction. The web 12a is removed at the end of the foaming region 10 by means of a reeling station 13b. The layer 12 is only subsequently wound by another reeling station 13c.

Figure 8:
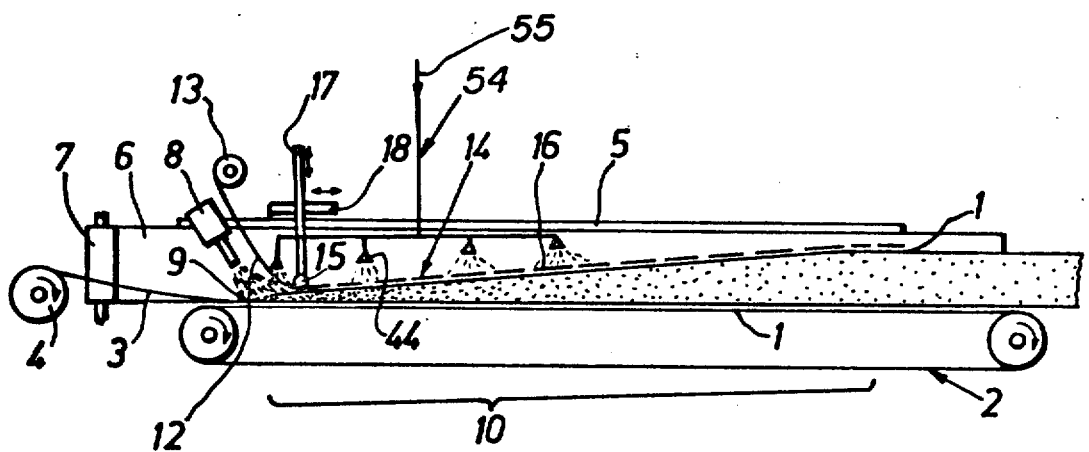
FIG. 8 shows an apparatus similar to FIG. 1 with a solvent-spraying arrangement.
Figure 9:
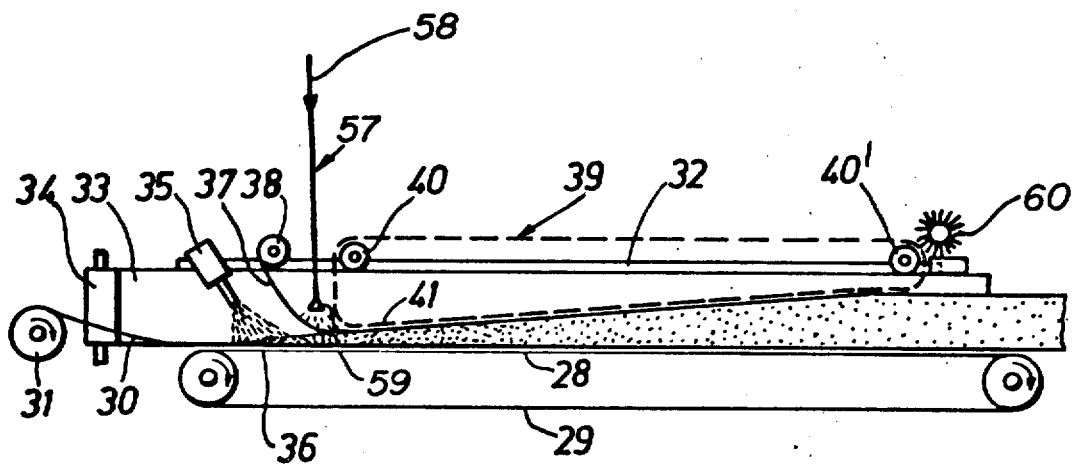
FIG. 9 shows an apparatus similar to FIG. 5 with a solvent-spraying arrangement and a stripper.

Devices comprising a cleaning arrangement are shown in FIGS. 8 and 9.

A solvent is applied to the bearing layer 12 by means of a cleaning arrangement 54 which is in the form of a solvent-applying device, so that a thin film of solvent is formed, which is stripped off on the slatted grating 16, so that no mixture can be deposited thereon. The solvent-applying arrangement consists of a supply pipe system 55 which opens into spraying nozzles 56. The bearing layer 12 is guided beneath the levelling device 14 which consists of a roller 15 and the slatted grating 16. The roller 15 is mounted for vertical adjustment in the supporting frame 17, which in its turn is guided in the carriage 18 displaceable in the conveying direction.

Referring to FIG. 9, a cleaning arrangement 57 consists of a solvent-applying arrangement 58 and 59, which co-operates with a cleaning brush 60. The solvent-applying device 58, 59, is arranged between the supply station 38 and the next adjacent roller 40. The cleaning brush 60 is associated with the other roller 40'.

We claim:

1. A process for the production of continuous foam plastic blocks by free-foaming in which a liquid, foamable mixture is supplied to a laterally bounded, travelling support on which the mixture foams up in a rising profile to the thickness of the block, and, after the supply of the mixture and before the zone in which a skin would be formed on the upper surface of the mixture, covering the upper surface of the rising profile with a web or foil which floats on the mixture and moves with the mixture during the foaming reaction, and surface leveling the rising profile transversely of the conveying direction with a leveling device overlying the web or foil and resting on the foaming plastic, said leveling device being supported by the rising foam without exerting any substantial pressure on the rising foam, and extending over substantially the full length of the rising profile.

2. A process as claimed in claim 1, wherein the web or foil is gas-permeable.

3. A process as claimed in claim 1, wherein the web or foil is gas-permeable, and a liquid-impermeable sheet is laid on the web or foil before the levelling operation to provide the liquid-impermeable sheet interposed between gas-permeable web or foil and the leveling device during the leveling operation.

4. A process as claimed in claim 3, wherein the liquid-impermeable sheet is removed after the foaming reaction.

5. A process as claimed in claim 3, wherein a combination of a gas-permeable web or foil with a liquid-impermeable sheet is laid on.

6. A process as claimed in claim 4, wherein the gas-permeable web or foil and the liquid-permeable sheet are detached simultaneously.

7. A process as claimed in claim 1, wherein the foam plastic is polyurethane.

8. A process for the production of continuous foam plastic blocks by free-foaming in which a liquid, foamable mixture is supplied to a laterally bounded, travelling support on which the mixture foams up in a rising profile to the thickness of the block, and, after the supply of the mixture and before the zone in which a skin would be formed on the upper surface of the mixture, covering the upper surface of the rising profile with a web or foil which floats on the mixture and moves with the mixture during the foaming reaction, and surface leveling the rising profile, covered with the web or foil, transversely of the conveying direction with a leveling device comprising a roller or doctor disposed adjacent the point where the mixture is supplied to the travelling support, and a slatted grating which follows the roller or doctor, the leveling device overlying the web or foil and the slatted grating being adapted to conform in the longitudinal direction to the rising profile of the foam block and resting on the foaming plastic, said slatted grating being supported by the rising foam without exerting any substantial pressure on the rising foam, and extending over substantially the full length of the rising profile.

9. A process as claimed in claim 8, wherein the web or foil is gas-permeable.

10. A process as claimed in claim 8, wherein the web or foil is gas-permeable, and a liquid-impermeable sheet is laid on the web or foil before the leveling operation to provide the liqiuid-impermeable sheet interposed between gas-permeable web or foil and the leveling device during the leveling operation.

11. A process as claimed in claim 10, wherein the liquid-impermeable sheet is removed after the foaming reaction.

12. A process as claimed in claim 10, wherein a combination of a gas-permeable web or foil with a liquid-impermeable sheet is laid on.

13. A process as claimed in claim 11, wherein the gas-permeable web or foil and the liquid-impermeable sheet are detached simultaneously.

14. A process as claimed in claim 8, wherein the foam plastic is polyurethane.

15. A process as claimed in claim 8, wherein the slats of the slatted grating extend transversely of the conveying direction.

16. A process as claimed in claim 8, wherein the web or foil is a paper web or plastic foil.

17. A process as claimed in claim 1, wherein the web or foil is a paper web or plastic foil.

* * * * *

UNITED STATES PATENT AND TRADEMARK OFFICE
CERTIFICATE OF CORRECTION

PATENT NO. : 4,150,075

DATED : April 17, 1979

INVENTOR(S) : Willi Schmitzer, et al

It is certified that error appears in the above-identified patent and that said Letters Patent are hereby corrected as shown below:

The attached sheets of drawings representing Figs. 1-9 should be inserted as part of the above-identified patent.

Column 2, line 6, "deformations" should read --deformation--;
          line 65, "or a porous" should read --of a porous--.

Column 5, line 42, correct the spelling of --which--;
          line 52, correct the spelling of --groove--;
          line 63, "lever" should read --layer--;
          line 66, "or which" should read --of which--.

Column 7, line 20, "liquid-permeable" should read --liquid-impermeable--.

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*

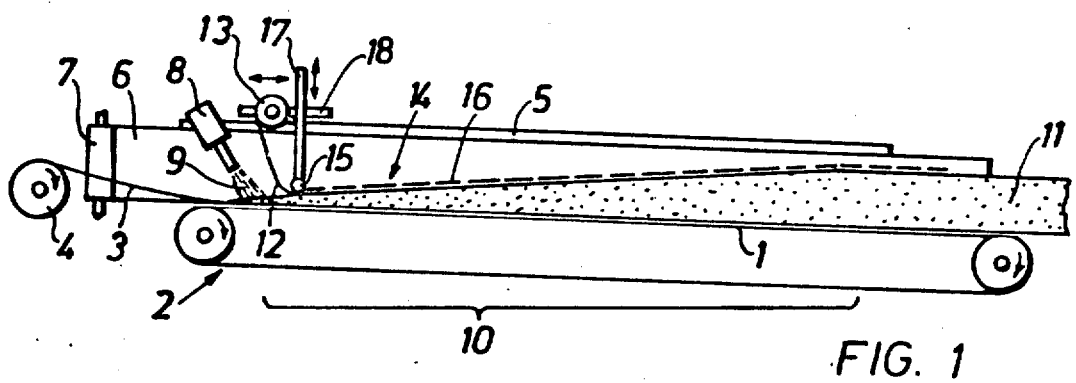
FIG. 1
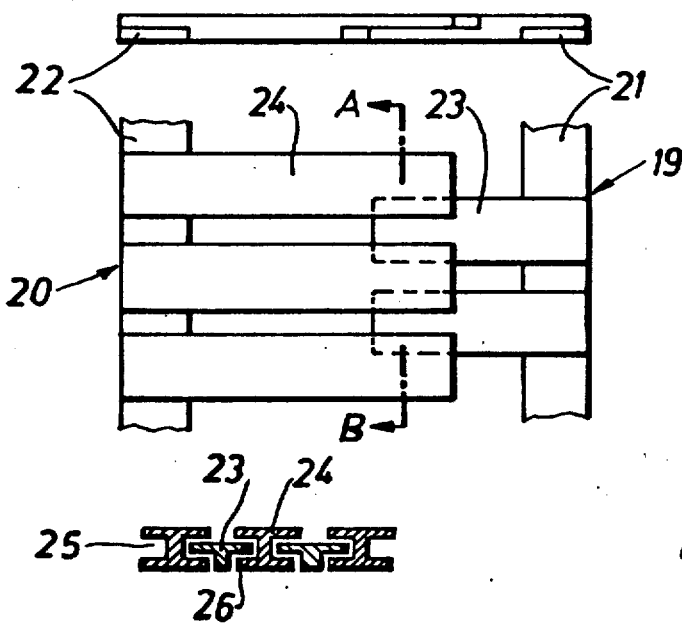
FIG. 2
FIG. 3
FIG. 4
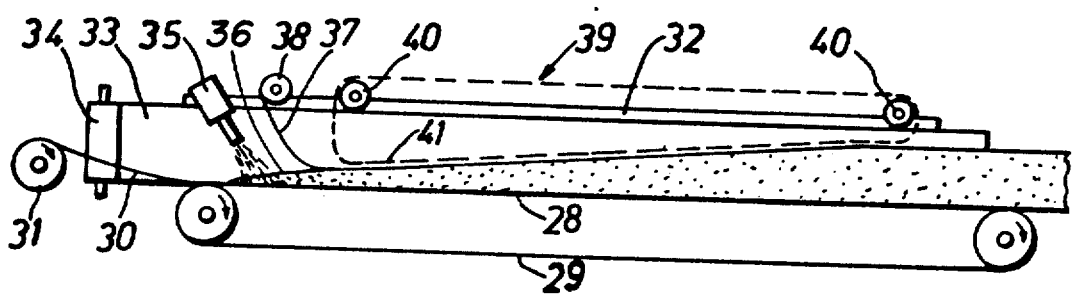
FIG. 5